(12) United States Patent
Arakawa et al.

(10) Patent No.: US 7,058,560 B1
(45) Date of Patent: Jun. 6, 2006

(54) PERFORMANCE PREDICTIVE APPARATUS AND METHOD

(75) Inventors: Kazunobu Arakawa, Tokyo (JP); Yasuhiro Hatakeyama, Tokyo (JP); Takashi Oshiro, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 09/453,207

(22) Filed: Dec. 3, 1999

(30) Foreign Application Priority Data

Dec. 4, 1998 (JP) ................................. 10-345647

(51) Int. Cl.
*G06F 17/10* (2006.01)
*G06F 15/173* (2006.01)

(52) U.S. Cl. ............................ 703/22; 703/2; 702/182; 702/183; 702/186; 709/223; 709/224; 709/225; 709/226

(58) Field of Classification Search ............... 703/2, 703/22; 702/179, 182–189; 714/4, 34–37; 709/47, 48, 223–226
See application file for complete search history.

(56) References Cited

U.S. PATENT DOCUMENTS 6,086,618 A * 7/2000 Al-Hilali et al. ............... 703/2
6,311,144 B1 * 10/2001 Abu El Ata .................... 703/2
6,789,050 B1 * 9/2004 Reeser et al. ................... 703/2

OTHER PUBLICATIONS

Ashley, David W. "A Canonical Correlation Procedure for Spreadsheets" presented at the 27th Annual Meeting of the Decision Sciences Institute, Nov. 24-26, 1996.*

Ingolfsson, Armann. "Development of a Spreadsheet Add-in for a Waiting Line Analysis". Aug. 27, 1999. Use of spreadsheet templates created by David W. Ashley, Sep. 14, 1998.*
Microsoft Corp, "In and Out of the Classroom: Emphasizing Your Point with Charts". Copyright 1998. http://www.methacton.org/inandoutclassroom/excel97/charts.htm.*
Microsoft Corp, "In and Out of the Classroom: Using Numbers, Formulas and Functions". Copyright 1998. http://www.methacton.org/inandoutclassroom/excel97/numbers.htm.*
Microsoft Corp, "In and Out of the Classroom: Starting Excel 97 as a Beginner". Copyright 1998. http://www.methacton.org/inandoutclassroom/excel97/start.htm.*

(Continued)

*Primary Examiner*—Paul L. Rodriguez
*Assistant Examiner*—Ayal Sharon
(74) *Attorney, Agent, or Firm*—Connolly Bove Rodge & Hutz LLP; Larry J. Hume (57) ABSTRACT

By providing a performance metrics calculation section 4 for calculating a predetermined performance metrics determined in advance from at least part of data from among various condition data concerning a performance evaluation model, which are input from condition input sections 1 to 3, calculating the predetermined performance metrics from the input condition data, and performing performance prediction using not only the input data but also the calculation result, unlike inputting a performance metrics on the basis of the prediction of a developer, there is no room where experience, intuition, or the like, of the developer enters, and the performance of the system can be represented with very objective numerical values even if any person performs.

17 Claims, 6 Drawing Sheets

OTHER PUBLICATIONS

Microsoft Press, Microsoft Press Computer Dictionary, Third Edition. Copyright 1997, p. 463.*

University of Plymouth Faculty of Technology. Syllabus for "Operational Research IV" class. Revision Date: Apr. 1997. http://www.tech.plym.ac.uk/maths/Courses/Stat3103/stat3103.html.*

Savage, Sam. "Weighing the Pros and Cons of Decision Technology in Spreadsheets", ORMS Today, vol. 24, No. 1, Feb. 1997. http://lionhrtpub.com/orms/orms-2-97/savage.html.*

McNickle, Don. "Queueing for Toilets", OR Insight, Apr.-Jun. 1998. http://www.orsoc.org.uk/about/topic/insight/toilets.htm.*

Enhancing Teaching with Technology Institute. "Excel Template User Guide". Revised Apr. 27, 1998. http://www.wmich.edu/etti/etti98/day4/userguide.html.*

Standridge et al. "Concepts for Modular Simulation Environments". Proceedings of the 26th conference on Winter simulation, 1994. pp. 657-663.*

Hammond et al. "A Simulation and Analysis of Bank Teller Manning". Proceedings of the 27th conference on Winter simulation, 1995. pp. 1077-1080.*

Menasce et al. "Capacity Planning and Performance Modeling." © 1994.*

Microsoft Press, "Computer User's Dictionary", 1998. p. 341.*

Transaction Performance Council (TPC), TPC Benchmark™ C, Standard Specification, Revision 3.5, Oct. 25, 1999.*

* cited by examiner

F I G. 1

FIG. 2A
SPECIFICATIONS OF SERVER MACHINE

| TYPE OF SERVER | TYPE OF MACHINE | NUMBER OF MACHINES | CPU CAPACITY [tpmC] | CPU CAPACITY [tpsC/CPU] | NUMBER OF CPUS | MEMORY [MB] | OS | CPU bg-load [%] | DISK TRANSFER RATE [MB/sec] | DISK ACCESS TIME [msec] |
|---|---|---|---|---|---|---|---|---|---|---|
| | | | | | | | | | | |

FIG. 2B
SPECIFICATIONS OF CLIENT MACHINE

| CLIENT GROUP | TYPE OF CLIENT | TYPE OF MACHINE | NUMBER OF MACHINES | CPU CAPACITY [tpmC] | CPU CAPACITY [tpsC/CPU] | NUMBER OF CPUS | MEMORY [MB] | OS | CPU bg-load [%] |
|---|---|---|---|---|---|---|---|---|---|
| | | | | | | | | | |
| | | | | | | | | | |
| | | | | | | | | | |
| | | | | | | | | | |

FIG. 2C
SPECIFICATIONS OF NETWORK

| ROUTE | TYPE OF LINE | CAPACITY OF LINE | bg-load [%] |
|---|---|---|---|
| | | | |
| | | | |
| | | | |
| | | | |

F I G. 3

F I G. 4

| WORK NAME | CLIENT | DIRECTION | OPERATING MACHINE | WEIGHT COEFFICIENT | NUMBER OF SQLS | TYPE OF CRUD | RECORD LENGTH [B] | NUMBER OF PROCESSES | NUMBER OF DBS TO BE MANIPULATED |
|---|---|---|---|---|---|---|---|---|---|
| | | | | | | | | | |
| | | | | | | | | | |
| | | | | | | | | | |
| | | | | | | | | | |
| | | | | | | | | | |
| | | | | | | | | | |
| | | | | | | | | | |

FIG. 5

| | WORK 1 | | WORK 2 | | ---------- | WORK n | |
|---|---|---|---|---|---|---|---|
| | $\lambda$ | $\rho$ | $\lambda$ | $\rho$ | | $\lambda$ | $\rho$ |
| CLIENT 1 | | | | | | | |
| CLIENT 2 | | | | | | | |
| CLIENT m | | | | | | | |

FIG. 6

PERFORMANCE PREDICTIVE APPARATUS AND METHOD

BACKGROUND OF THE INVENTION

1. Field of the Invention

The present invention relates to a performance predictive apparatus, a method, and a recording medium, in particular, suitably used for a system for evaluating the performance of a computer system built with machines, a network, etc.

2. Description of the Related Art

Generally, in case of building a certain computer system, the system is built through processes including proposal of system contents, definition of requirements, design of details, implementation, and testing, and then put into operation. Such system building is normally performed in accordance with the needs or requirement (e.g., the request within how many seconds the data read on the database should be restrained) of a customer or system user. To meet the needs or requirement, as the server machine, the client machine, and the network for connecting them, to build the system, appropriate ones must be used.

Conventionally, however, system sizing such as that what specifications of server and clients should be put in the computer system to be built or that what capacity of network should be introduced, depends on experience or intuition of the system developer. Whether the customer's needs or requirement are met, is evaluated by actually operating the system at the time of completing the system. In case of changing the network topology of the system wherein various types of hardware are connected via a network, the problem of what distribution of loads on the system is also dependent on experience or the like.

For this reason, the system thus built depending on experience or intuition, often results in customer's undesirability. In this case, there may arise the necessity of rebuilding the system to meet the needs or requirement of the customer, and there is the problem of resulting in requiring large labor and high cost.

So, in recent years, to avoid such an inconvenience, a simulation model of the system to be built is first created on a computer, and simulation is executed by inputting various parameters to the model, and thereby the system performance is estimated. On the basis of the estimation result, the system configuration or sizing of each machine is performed.

But, even in case of using such simulation, the parameters to be input to the simulation model are determined by the system developer on the basis of his or her own experience or intuition. For this reason, there is a difference in estimation result of performance according to the person in charge, and, in some cases, the system may be built on the basis of an erroneous performance estimation result. In this case, there arises the same problem as described above.

In addition, because, in the conventional simulator, an absolute value (e.g., an absolute time of how many seconds are required for performing a certain process by using a CPU of a certain specification) predicted by the developer or the like, is input, even when the specification of a machine included in the simulation model are changed, the response time is unchangeable as an absolute value, and the obtained performance estimation result becomes the same, and there is the problem of lacking in reliability.

Besides, particularly at the early stage of system development before an order or before long after the order, only an outline of the system to be built is known, and its minute construction is not yet made to be detailed. So, at this stage, a detailed simulation model is hard to create, and it cannot but be only an approximate model, and the amount of information necessary for parameter input is also small. For this reason, there are also the problems that it is difficult to input appropriate parameters, and it is very hard to evaluate the system performance accurately.

SUMMARY OF THE INVENTION

The present invention has been made to solve such problems, and aims not only accurately to predict the performance of a system to be built, but also to obtain a consistent performance estimation result whoever performs, independently of the experience or intuition of the system developer or the like.

Besides, the present invention aims to allow accurate prediction of the performance of a system even in the state that all the necessary pieces of information are not yet complete at the early stage of system development, and make it possible accurately to predict how the system finally aimed at is built from a small quantity of information.

In order to achieve the above objects, a performance predictive apparatus of the present invention is a performance predictive apparatus for predicting performance on the basis of input condition data, characterized by comprising condition input means for inputting the above condition data, performance metrics calculation means for calculating a predetermined performance metrics determined in advance from at least part of the above input condition data, and performance predictive calculation means for predicting performance using the above input condition data and the above calculated performance metrics as input condition data for performance predictive calculation.

In another aspect of the present invention, it is characterized in that the above condition input means has templates to input the above condition data.

Here, as the above templates, for example, different templates are prepared in accordance with at least one of a type of system whose performance is to be predicted, a phase of system development, and a type of performance metrics to be calculated.

In another aspect of the present invention, it is characterized in that the above performance metrics calculation means calculates a different performance metrics in accordance with the given condition data or the used template.

Here, the above performance metrics calculation means may prepare different arithmetic equations in advance, and comprise calculation selection means for selecting an arithmetic equation to be used in accordance with the given condition data or the used template.

Besides, the above performance metrics calculation means may comprise means for correcting an arithmetic equation of the above performance metrics in accordance with the given condition data or the used template. In this case, correction of the above arithmetic equation may be performed by changing a weight coefficient for each condition data.

In another aspect of the present invention, it is characterized in that the above performance predictive calculation means performs processing of graphing and outputting statistic values calculated on the basis of various condition data values, in addition to calculating the statistic value of performance predictive data.

Besides, the above performance predictive calculation means may automatically determine condition data satisfying requested performance and output the result.

A performance predictive method of the present invention is a performance predictive method of predicting performance on the basis of input condition data, characterized by comprising a condition input step of inputting the above condition data, a performance metrics calculation step of calculating a predetermined performance metrics determined in advance from at least part of the above input condition data, and a performance predictive calculation step of predicting performance using the above input condition data and the above calculated performance metrics as input condition data for performance predictive calculation.

In another aspect of the present invention, it is characterized in that input of the above condition data in the above condition input step is performed for templates prepared in advance.

Here, as the above templates, for example, different templates are prepared in accordance with at least one of a type of system whose performance is to be predicted, a phase of system development, and a type of performance metrics to be calculated.

In another aspect of the present invention, it is characterized in that, in the above performance metrics calculation step, a different performance metrics is calculated in accordance with the given condition data or the used template.

A recording medium of the present invention is a recording medium characterized by recording condition input means for inputting various conditions concerning a performance predictive model, performance metrics calculation means for calculating a predetermined performance metrics determined in advance from at least part of the above input condition data, and performance predictive calculation means for predicting performance using the above input condition data and the above calculated performance metrics as input condition data for performance predictive calculation.

In another aspect of the present invention, it is characterized by recording a program causing a computer to execute a condition input step of inputting various conditions concerning a performance predictive model, a performance metrics calculation step of calculating a predetermined performance metrics determined in advance from at least part of the above input condition data, and a performance predictive calculation step of predicting performance using the above input condition data and the above calculated performance metrics as input condition data for performance predictive calculation.

In the present invention, as described above, since performance prediction is performed using not only the input condition data but also the calculation result obtained by calculating a predetermined performance metrics from this, unlike inputting a performance metrics on the basis of the prediction of a user, there is no room where experience, intuition, or the like, of the user enters, and, not only accurate performance prediction can be performed, but also an even prediction result can be obtained even if any person performs.

Besides, according to another characteristic of the present invention, since a different performance metrics is calculated in accordance with the given condition data or the like, for example, by changing the arithmetic equation in accordance with various types of systems, various phases of system development, and various types of performance metrics to be obtained, it can cope with various needs or requirement of various customers. Especially, even in the state of a small amount of information obtained at the early phase of system development, accurate performance evaluation can be performed from such a small amount of information.

Further, according to another characteristic of the present invention, in addition to calculating a statistic value of performance predictive data, since statistic values calculated with variously changing a condition data value is graphed and output, or processing of automatically determining condition data meeting the requested performance and outputting the result is performed, not a vague value as the conventional so-called safety allowance but a performance predictive value based on statistic data can be output, and the result of performance prediction can be provided in a manner which is easy for the user to understand.

BRIEF DESCRIPTION OF THE DRAWINGS

FIGS. 2A to 2C are views showing an example of template to input hardware condition parameters, in which

DETAILED DESCRIPTION OF THE PREFERRED EMBODIMENTS

Hereinafter, an embodiment of the present invention will be described with reference to drawings.

Figure 1:
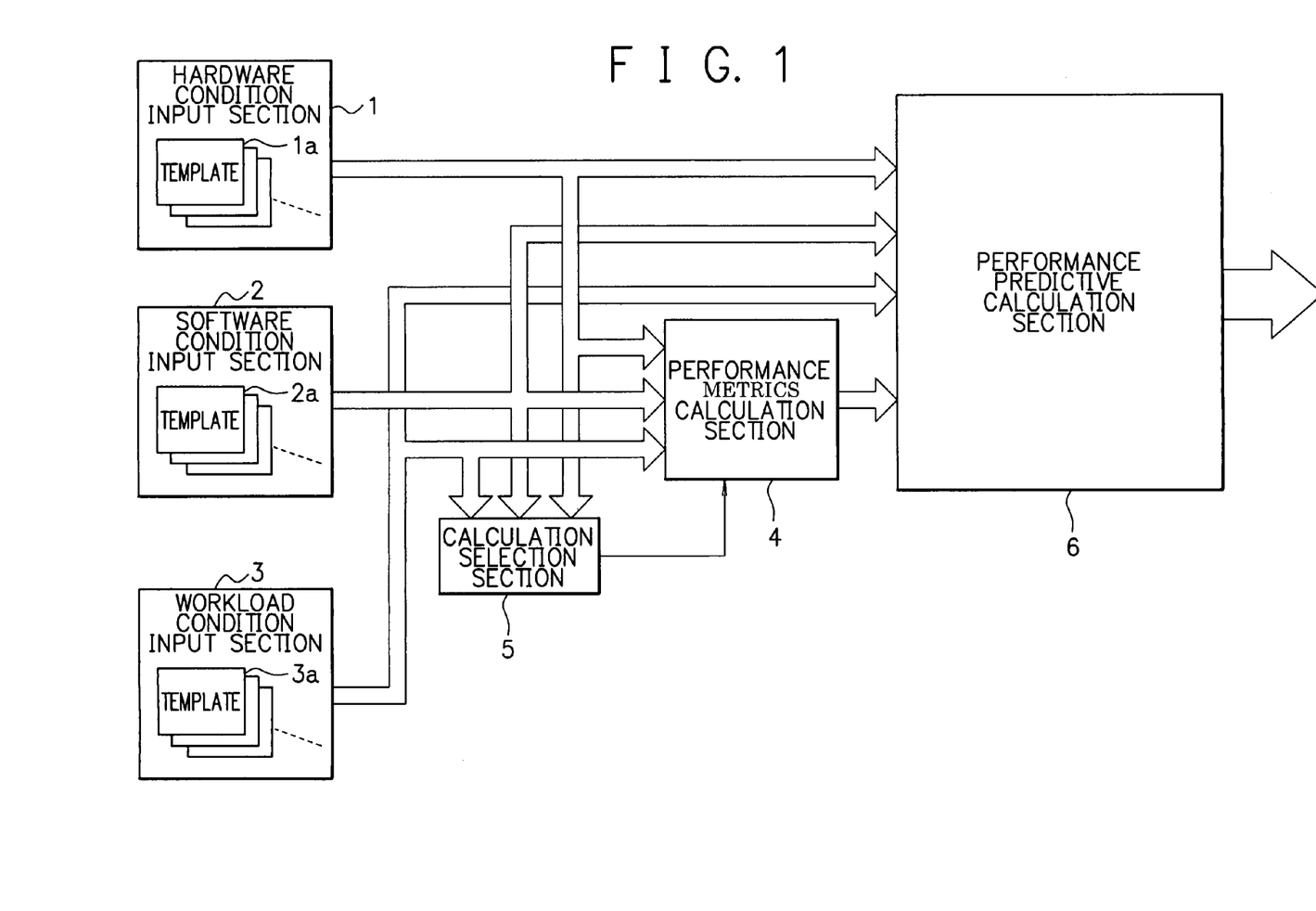
FIG. 1 is a block diagram showing the functional arrangement of a performance predictive apparatus according to this embodiment.

FIG. 1 is a block diagram showing the functional arrangement of a performance predictive apparatus according to this embodiment. In FIG. 1, 1 denotes a hardware condition input section, 2 denotes a software condition input section, and 3 denotes a workload condition input section. In this embodiment, when a simulation model of a computer system to be built is made, it is thought by roughly dividing into a hardware model, a software model, and a workload model, and necessary conditions are input to the respective models by the above input sections 1 to 3.

Here, the hardware model is that defines conditions related to hardware to be included in the system to be built. For example, the physical performances of hardware and combination thereof, including the hardware specifications and data input/output specifications of server machines and client machines, and the network topology (system configuration), are input from the hardware condition input section 1.

This hardware condition input section 1 is provided with types of templates 1a. In these templates 1a, items of various hardware conditions to be input are listed. For example, ones having different items to be input are prepared in accordance with the types of systems to be built (in accordance with what hardware is essential in the system, etc.). Besides, since the details of the simulation model and conditions to be given change normally as the system development progresses through proposal of contents, definition of requirements, design of details, implementation, testing, etc., a different template may be prepared in each of the processes.

Figure 2A:
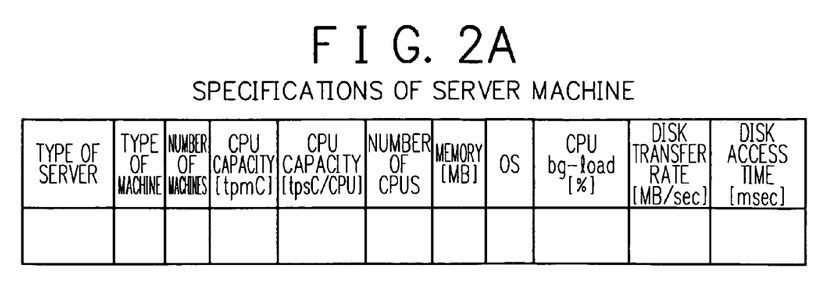
FIG. 2A is a view showing an example of a template to input the specifications of a server machine.
Figure 2B:
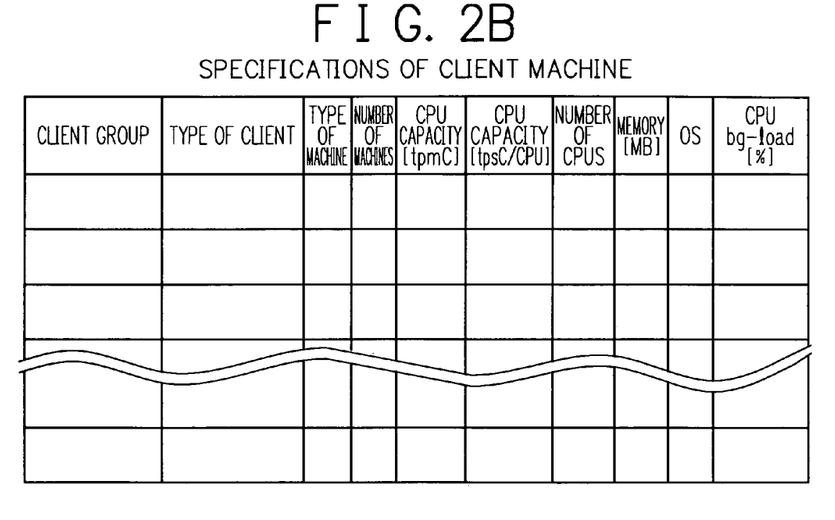
FIG. 2B is a view showing an example of a template to input the specifications of a client machine.
Figure 2C:
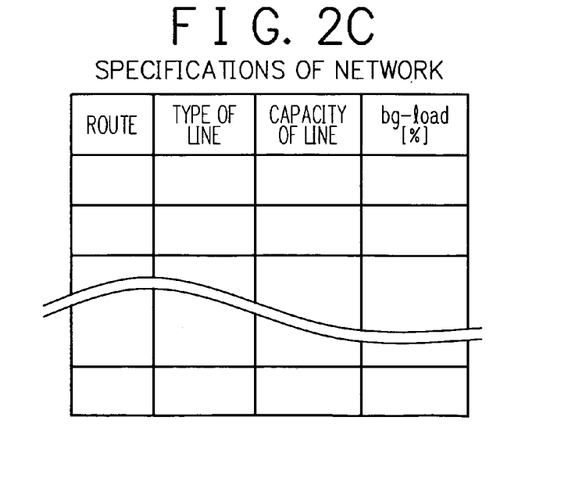
FIG. 2C is a view showing an example of a template to input the specifications of a network.

FIGS. 2A to 2C show an example of template 1a to input the above hardware conditions. FIG. 2A shows a template to input the specifications of a server machine. FIG. 2B shows a template to input the specifications of a client machine. FIG. 2C shows a template to input the specifications of a network. Hardware specifications input with these templates are almost uniquely determined without any subject when machines or the like to be used are determined. Although various items are shown here, since minimum necessity for evaluation of the system performance is CPU capacity and disk capacity, the templates can have any formats as far as they have items concerning this.

Figure 3:
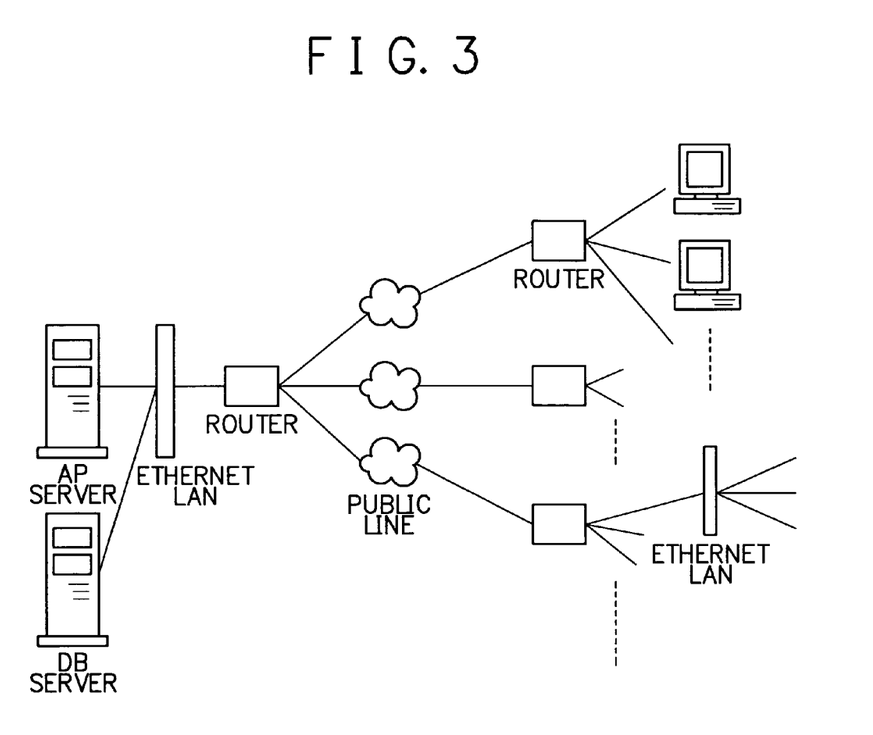
FIG. 3 is a view showing an example of a system configuration input from a hardware condition input section.

Besides, in the hardware condition input section 1, not only conditions by the templates shown in the above FIGS. 2A to 2C but also the system configuration itself as shown in the next FIG. 3 is input. The system configuration is that defines the combination, connection relationship, or the like, of hardware used in the system to be built. This may be to input the model as FIG. 3 as an image or to input the connection relationship or the like as text data. Here is shown an example showing a three-tier model in which clients, an application server, and a database server are connected through public lines.

Next, the software model is that defines conditions of how to process each work of the service provided by the system. The software condition input section 2 of FIG. 1 is provided with types of templates 2a, like the hardware condition input section 1. That is, ones having different items to be input are prepared in accordance with the types of systems to be built (in accordance with what process is performed in the system, etc.). Besides, a different template may be prepared in each process of system development.

Figure 4:
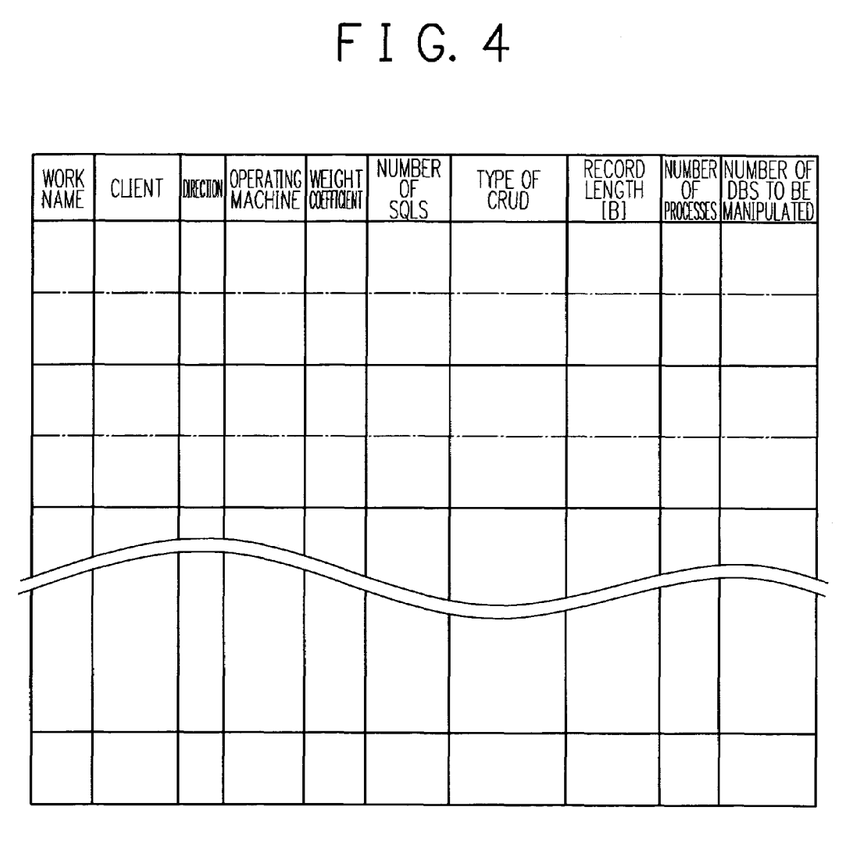
FIG. 4 is a view showing an example of template to input software condition parameters.

FIG. 4 shows an example of template 2a to input the above software conditions. This template 2a is that various work conditions to be input are listed as items, and one row corresponds to one work. Each of groups divided by alternate long and short dashed lines represents a large work flow. The system developer or the like inputs conditions of work execution using this template 2a. Also in software conditions input with this template 2a, the most are almost uniquely determined without any human factors when works to be performed, hardware to be used in the system, etc., are determined.

Besides, the workload model is that defines how frequently a user requests execution of each work in the system, in other words, the load source. The workload condition input section 3 of FIG. 1 is also provided with types of templates 3a. That is, ones having different items to be input are prepared in accordance with the types of systems to be built (in accordance with whether the objective work is an online work or a package work, what process is performed by whom in the system, etc.). Besides, a different template may be prepared in each process of system development.

Figure 5:
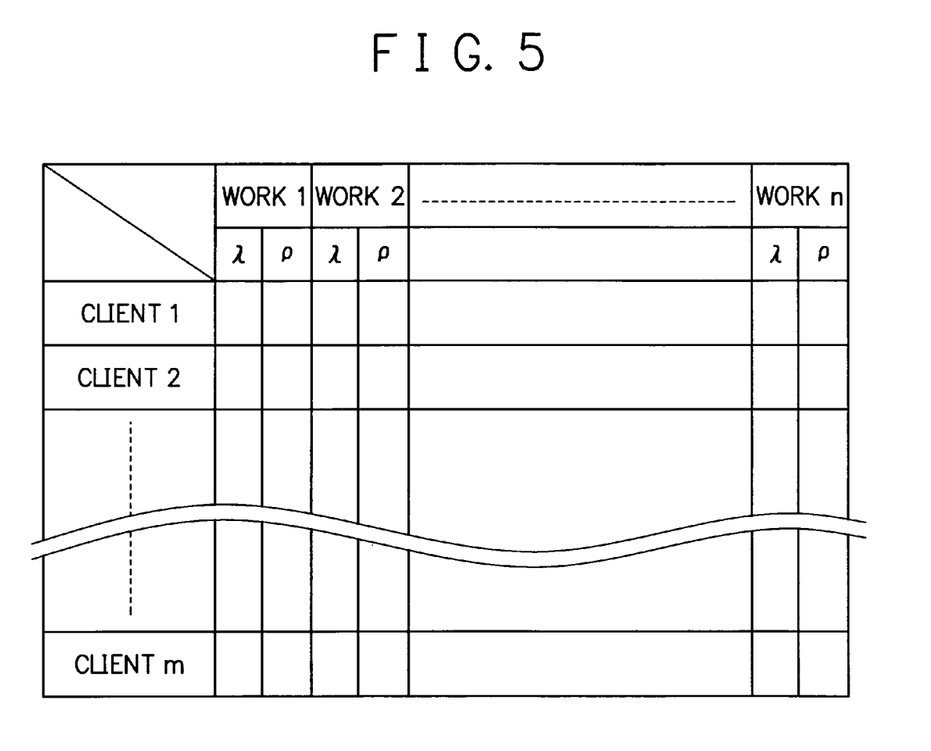
FIG. 5 is a view showing an example of template to input workload condition parameters.

FIG. 5 shows an example of template 3a to input the above workload conditions. This template 3a is for inputting workload conditions which client performs which work how frequently. For the frequency to be input, an average occurrence frequency $\lambda$ and a peak ratio $\rho$ are defined. Here, the frequency $\lambda$ is the number of times of occurrence of objective works per unit time (e.g., what number of times occurs per hour), and the peak ratio $\rho$ is what times it becomes at the peak time.

When objective works are generated by manual input, i.e., they do not occur at constant intervals, a specific probability distribution (e.g., exponential distribution) is assumed as the distribution of occurrence intervals. For example, if a certain document input is performed three times per hour, an exponential distribution of 20 min in average is used as the input value to the simulator.

On the other hand, when a document input result is to be automatically printed once per two hours, or the like, as it is printed just every two hours, constant occurrence intervals are assumed.

Using the templates 1a, 2a, and 3a as above, the system developer inputs various parameters associated with what number of server machines or client machines of what specifications, and how frequently each client machine executes each application, for example, when plural application software are executed in a client/server system.

In the example of FIG. 1, the condition input section is divided into three, i.e., the hardware condition input section, the software condition input section, and the workload condition input section. But, one condition input section may be provided with the templates 1a, 2a, and 3a for hardware conditions, software conditions, and workload conditions.

Besides, the above-described templates 1a, 2a, and 3a may be displayed on the screen of a not-shown display section provided in the performance predictive apparatus of this embodiment, and may be directly input using an input device such as a keyboard or a mouse, or they may be printed on papers, and may be read by a not-shown image input device such as a scanner.

Referring back to FIG. 1, 4 denotes a performance metrics calculation section and calculates predetermined metrics necessary to evaluate system performance on the basis of at least part of information on the condition values input by the above hardware condition input section 1, software condition input section 2, and workload condition input section 3.

For example, as examples of this performance metrics, the number of transactions of TPC-A to TPC-D conversion by the Transaction Processing Performance Council or the number of instructions of MIPS (Million Instruction Per Second) conversion is calculated and output. Besides, a SPECmark value or a SPECint value by SPEC (Systems Performance Evaluation Cooperative) may be calculated and output. At this time, if there are processes or tasks, these performance metrics are calculated and output to correspond to the number.

These performance metrics are generally hard to predict and input by a user, and, in this embodiment, this is calculated in accordance with a predetermined arithmetic equation without any human factors such as experience or intuition of a user. An example of this arithmetic equation is shown as follows:

Tran=f(CPU capacity, disk capacity, the number of SQLs, type of CRUD, record length, the number of rows of the table or tables to be manipulated, the total number of rows of the table or tables to be manipulated) (1)

In the above equation (1), Tran is the number of transactions of TPC-C conversion, and f( ) is a function for calculation using the parameters in parentheses. Besides, the CPU capacity and the disk capacity as the above parameters are part of information about the hardware conditions exemplified in FIGS. 2A to 2C, and the number of SQLs, the type of CRUD, the record length, the number of processes, and the total number of tables to be manipulated are part of information about the software conditions exemplified in FIG. 4.

For example, when

> Processing time=processing time in DB (database)+ processing time in communication software (communication time is not included)

is assumed, the arithmetic equation for performance metrics is

> Tran=$f$(parameter for DB load caluclation)+$g$(parameter for middleware load calculation)+$h$(parameter for communication software load calculation).

The functions f( ), g( ), and h( ) are used by weighting or obtaining a reduction formula from an actual measurement result.

The templates shown in FIGS. 2 to 5 are that assume a system using a database as the system to be built. For that reason, for example, information input as software conditions includes the number of SQLs (Structured Query Languages) concerning the database language, the type of CRUD which of creation/reference/update/deletion and the like the access to the database is, the record length, the number of processes, the total number of DBs to be manipulated, or the like. Hence, the performance metrics calculation section 4 calculates the performance metrics as the equation (1) using these pieces of information.

In this embodiment, as this equation (1), at least part of information of the parameters input by the hardware condition input section 1, the software condition input section 2, and the workload condition input section 3 are combined to calculate, e.g., the number of transactions Tran converted to correspond to the number of transactions of TPC-C. At this time, specific parameters of the parameters contained in the equation (1) are used to calculate the first weight w1, and the second and the third weights w2 and w3 are calculated using a combination of other specific parameters. And, by multiplying the weights w1, w2, and w3 by the number of processes, the number of transactions is obtained finally.

For example when $w_1$ is a weight determined by the reference value of the processing time, the CPU capacity, the disk capacity, w2 is a weight determined by the type of CRUD and the like, and w3 is a weight determined by the number of processes, the total number of tables to be manipulated, the presence/absence of an index, and the like, the equation (2) is expressed by:

$$Tran=w_1 \times w_2 \times w_3 \times \text{the number of processes} \quad (2)$$

Besides, in this embodiment, the performance metrics calculation section 4 has arithmetic equations (arithmetic means) including the above-described equation (1), and a calculation selection section 5 selects which arithmetic equation is to be used. Although the above equation (1) is an effective equation for a system using a database, as described above, when the system to be built is different, because the parameters of hardware conditions, software conditions, and workload conditions input by the condition input sections 1 to 3 change, all the parameters in the equation (1) are not always input, and there is a case that the same equation (1) cannot apply.

Besides, even when the system to be built is the same, parameters to be input change depending on what timing of proposal of the system, definition of requirements, design of details, implementation, testing, etc., system evaluation is executed at. That is, at the early stage before an order or immediately after the order, since only an outline of the system is known, a simulation model is rough, and parameters to be given to this cannot be set in detail. Contrastingly to this, when the phase of system development progresses, since inputting more detailed parameters becomes possible, in this case, transactions and the like can be calculated using more detailed parameters.

Further, the arithmetic equation to be used must naturally change depending on whether the number of transactions of TPC-C conversion is to be calculated, or the MIPS value or SPECint value is to be calculated, and, in this case, the types of parameters to be input by the condition input sections 1 to 3 also change.

For that reason, the performance metrics calculation section 4 of this embodiment prepares arithmetic equations in advance to cope with differences in system to be built, the progression phase of system development, desired type of performance metrics, and the like, and can selectively use an appropriate arithmetic equation among them. At this time, as for which arithmetic equation is to be selected, the calculation selection section 5 determines what are present in the parameters input from the condition input sections 1 to 3 and selects an appropriate arithmetic equation using the parameters.

The parameters input from the condition input sections 1 to 3 to the calculation selection section 5 are actually input using the templates 1a to 3a, and which parameter is to be input is uniquely determined depending on which template used for the input. Accordingly, the calculation selection section 5 may select an appropriate arithmetic equation by checking which template used by each of the condition input sections 1 to 3.

A performance predictive calculation section 6 of FIG. 1 calculates and outputs the predictive values of the performance of the objective system, on the basis of both the condition input values of the hardware conditions, the software conditions, and the workload conditions input by the condition input sections 1 to 3 and the performance metrics such as the number of transactions calculated by the performance metrics calculation section 4. The system performance said here is that indicates as numerical values how the system satisfies the needs or requirement that the customer requires, and is represented by, e.g., the response time of each process, the number of processes in queue, the utilization efficiency of computer resources such as a CPU and a disk, processing time, or the like.

Although the performance metrics such as the number of transactions can be obtained by calculation using parameters, because the above-described performance predictive value such as the response time can vary due to occurrence of conflict of computer resources or the like, it is difficult to obtain by a simple arithmetic equation. For that reason, in the performance predictive calculation section 6, various events are generated using given condition input values, performance metrics, or the like, and the statistic value (e.g., the average value, the standard deviation, or the like) of the above-described performance predictive value is obtained by performing a simulation.

Although this performance predictive calculation section 6 can use conventional software of a simulator or the like, in this embodiment, especially, not only calculation of the statistic values of the performance predictive value but also processing of graphing statistic values calculated with variously changing the parameter values (i.e., variously changing the condition input values input using the templates 1a to 3a) and displaying on the screen is performed.

Figure 6:
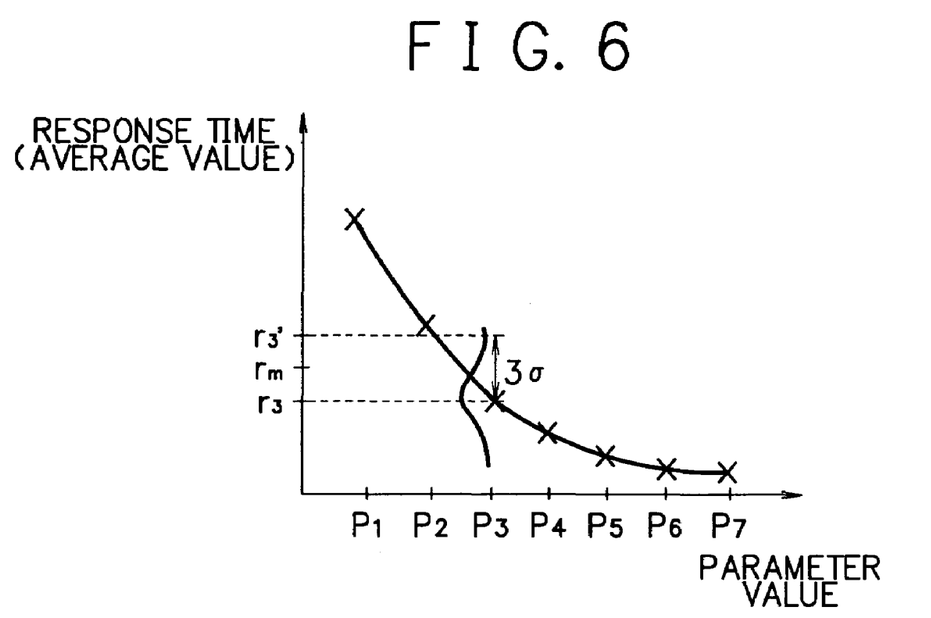
FIG. 6 is a view showing an example graphing a result when a simulation of response time is performed with changing a specific parameter.

FIG. 6 shows an example graphing a result of performing a simulation of the response time with variously changing a certain specific parameter. In FIG. 6, the abscissa represents parameter values, and the ordinate represents the average value of response times. Such a graph can be displayed because the performance metrics calculation section 4 calculates the number of transactions and the like, which are important elements for system performance evaluation, on the basis of the input parameters, and the response time is simulated from the number of transactions and the like, instead of directly inputting the predictive value of the response time to the performance predictive calculation section 6 as an absolute value by the developer.

That is, in the conventional simulation method, since the predictive value of the response time was directly input as an absolute value, such a graph could not be displayed. Contrastingly to this, in this embodiment, a graph how the response time changes can be made and displayed by changing parameters to be given. For example, by using the specification (the CPU performance or the like) of the server as the parameter for the abscissa, and variously changing the specification of the server to $p_1$ to $p_7$ in the simulator, a graph how response characteristics of the CPU change can be written.

When thus graphing and displaying are performed, it can be known at a glance which specifications should be used for the server to meet the customer's requirements, and appropriately sizing the server can be performed easily. For example, when there is a customer's requirement that the response time of the CPU is desired to be not more than at least $r_m$ sec in average, it can be immediately seen that one in which the specifications of the server are given by at least the parameters $p_3$ to $p_7$ should be used.

Here, further to clarify which are specifications meeting the customer's requirements, for example, the part that does not meet the requirements and the part meeting the requirements may be displayed in different colors, or a guide indicating where the response time required by the customer is may be displayed.

Besides, since it can be also immediately seen by referring to this graph what specification corresponds to what response time, and it can be used as a material for examination for what is the specification actually required.

Besides, by displaying not only the average value of response times but also the standard deviation together, performance guarantee can be made more accurate. That is, when many conflicts of computer resources occur in the simulator, the response characteristics degrade to increase variance. So, by referring also to the value of this standard deviation, it can be known how frequently degradation in response characteristics is beyond customer's desire.

In the example of FIG. 6, a value $r_3'$ that the value of three-times standard deviation $3\sigma$ is added to an average value $r_3$ of the response times at the time of the parameter $p_3$ is shown as a representative value. In this FIG. 6, for example, when the customer's requirement is that the response time of the CPU is desired to be always not more than $r_m$ sec, it can be easily seen from the graph that one in which specification of the server is given by the parameter $p_3$ is inappropriate.

Although an example in which statistic data of the performance predictive value calculated with variously changing the parameter value is graphed and displayed on the screen is shown here, the statistic data itself may be output. For example, when the customer's requirement is that the response time of the CPU is desired to be absolutely suppressed within a certain time, the performance predictive calculation section 6 may automatically output the value of $3\sigma$. In this case, the performance predictive calculation section 6 may automatically determine the specification meeting the customer's requirements and output the specification (parameter) together with the performance predictive value at that time.

As described above in detail, in the performance predictive apparatus of this embodiment, a predetermined performance metrics such as the number of transactions, which is an important element for system performance evaluation, is calculated using a predetermined arithmetic equation from input parameters, and the performance evaluation is performed using the calculation result. Accordingly, unlike inputting a performance metrics such as the number of transactions on the basis of the prediction of the developer, since there is no room where experience, intuition, or the like, of the developer enters, the performance of the system can be represented with very objective numerical values, and a reliable and consistent performance evaluation can evenly be obtained even if any person performs.

Besides, in this embodiment, as the above predetermined arithmetic equation, since arithmetic equations are prepared in accordance with various types of systems, various phases of system development, and various types of performance metrics to be obtained, and an appropriate one can be selected and apply in accordance with given parameters, it is possible to cope with various requirements of various customers. Especially, even at the early phase of system development before and after order reception, by obtaining the predetermined performance metrics by objective calculation as described above, it is possible to perform accurate evaluation from a small amount of information.

The performance predictive apparatus of this embodiment as described above is constituted by CPU or MPU, RAM, ROM, etc., of a computer, and can be realized by executing a program stored in the RAM or ROM. Accordingly, it can also be realized by storing a program causing the computer to provide the above functions in a recording medium such as a CD-ROM and loading the program in the computer. As the recording medium, other than the CD-ROM, a floppy disk, a hard disk, a magnetic tape, an optical magnetic disk, a nonvolatile memory card, or the like, can be used.

Besides, in case that the functions of the above-described embodiment are realized not only by the computer executing the supplied program but also the functions of the above-described embodiment are realized by the program cooperating with the OS (Operating System) running on the computer or another application software or the like, or in case that all or part of processing of the supplied program is executed by a function expansion board or function expansion unit of the computer and the functions of the above-described embodiment are realized, the program is contained in the embodiment of the present invention.

Although an example in which the performance metrics calculation section 4 prepares arithmetic equations in advance, is shown in the above embodiment, one or some arithmetic equations may be corrected by changing the weight coefficient for each given condition data. Besides, the arrangement and operation of the performance predictive apparatus shown in the above embodiment show merely an example of concretion for implementation of the present invention, and the technical scope of the present invention must not limitedly be interpreted by these. That is, the present invention can be implemented in various forms without departing from its spirit and principal characteristics.

What is claimed is:

1. A performance predictive apparatus for predicting performance of a simulated computer system on the basis of input condition data, comprising:
condition input means for inputting the input condition data of hardware conditions, software conditions, and workload conditions of the simulated computer system;
a processor for calculating performance metrics determined in advance from at least part of the input condition data,
wherein performance metrics are determined at least in part by a function comprising a database load calculation, a middleware load calculation, and a communication software load calculation; and
performance predictive calculation means for predicting performance using the input condition data of hardware conditions, software conditions, workload conditions, and the calculated performance metrics as input condition data for performance predictive calculation of the simulated computer system.

2. A performance predictive apparatus described in claim 1, wherein the condition input means has templates for each kind of conditions to input the condition data of hardware conditions, software conditions, and workload conditions.

3. A performance predictive apparatus described in claim 2, wherein different templates are prepared in accordance with at least one of a type of system whose performance is to be predicted, a phase of system development, and a type of performance metrics to be calculated.

4. A performance predictive apparatus described in claim 2, wherein the performance metrics calculation means calculates different performance metrics in accordance with given condition data or a used template.

5. A performance predictive apparatus described in claim 4, wherein the performance metrics calculation means comprises means for correcting an arithmetic equation of the performance metrics in accordance with the given condition data or the used template.

6. A performance predictive apparatus described in claim 5, wherein the correction of the arithmetic equation is performed by changing a weight coefficient for each condition data.

7. A performance predictive apparatus described in claim 1, wherein the performance predictive calculation means performs processing of graphing and outputting statistical values calculated on the basis of various condition data values, in addition to calculating statistical values of performance predictive data.

8. A performance predictive apparatus described in claim 1, wherein the performance predictive calculation means automatically determines condition data satisfying requested performance and outputs the result.

9. A performance predictive method for predicting performance of a simulated computer system on the basis of input condition data, the method comprising:
inputting the condition data of hardware conditions, software conditions, and workload conditions of the simulated computer system;
calculating performance metrics determined in advance from at least part of the above input condition data and by a function comprising a database load calculation, a middleware load calculation, and a communication software load calculation; and
predicting performance of the simulated computer system using the input condition data of hardware conditions, software conditions, and workload conditions and the calculated performance metrics as input condition data for a performance predictive calculation.

10. The method of claim 9, further comprising providing a plurality of templates for each kind of conditions to input the condition data of hardware conditions, software conditions, and workload conditions.

11. The method of claim 10, further comprising preparing different templates in accordance with at least one of a type of system whose performance is to be predicted, a phase of system development, and a type of performance metrics to be calculated.

12. The method of claim 10, wherein said calculating performance metrics calculates different performance metrics in accordance with the given condition data or a used template.

13. An article of manufacture comprising a recording medium that stores computer executable instructions which, when executed, carry out the functions of:
inputting various conditions concerning a performance predictive model of hardware conditions, software conditions, and workload conditions,
calculating performance metrics determined in advance from at least part of the input condition data and by a function comprising a database load calculation, a middleware load calculation, and a communication software load calculation, and
predicting performance using the input condition data of hardware conditions, software conditions, workload conditions, and the above calculated performance metrics as input condition data for performance predictive calculation.

14. An article of manufacture comprising a computer-readable recording medium that stores a computer program, which, when executed, carries out the functions of:
inputting various conditions concerning a performance predictive model of hardware conditions, software conditions, and workload conditions,
calculating performance metrics determined in advance from the input condition data and by a TRAN function derived from the software conditions, and
predicting performance using the input condition data of hardware conditions, software conditions, workload conditions, and the calculated performance metrics as input condition data for a performance predictive calculation.

15. A performance predictive apparatus for predicting performance of a computer system on the basis of input condition data, comprising:
hardware condition input means for inputting hardware conditions;
software condition input means for inputting software conditions;
workload condition input means for inputting workload conditions;
a processor that calculates at least one performance metric of a transaction number and an instruction number, on the basis of the condition data input through at least one of the input means; and
performance predictive calculation means for calculating a system performance predictive value on the basis of the calculated performance metrics and the input condition data of hardware conditions, software conditions, and workload conditions comprising a database load calculation, a middleware load calculation, and a communication software load calculation.

16. The apparatus of claim 1, wherein the simulated computer system comprises a database.

17. A performance predictive apparatus for predicting performance of a simulated computer system, the apparatus comprising:
 a computer system for:
  receiving input condition data related to hardware conditions, software conditions, and workload conditions;
  calculating performance metrics using at least a portion of the input condition data and a TRAN function; and
  predicting performance of the simulated computer system using the input condition data and the calculated performance metrics.

* * * * *